United States Patent [19]

Itojima et al.

[11] Patent Number: 5,694,636
[45] Date of Patent: Dec. 2, 1997

[54] PHOTOGRAGHIC PROCESSING APPARATUS

[75] Inventors: Mitsuhiko Itojima; Teruhito Oka, both of Wakayama, Japan

[73] Assignee: Noritsu Koki Co., Ltd., Wakayama-ken, Japan

[21] Appl. No.: 587,279

[22] Filed: Jan. 16, 1996

[30] Foreign Application Priority Data

Jan. 18, 1995 [JP] Japan .................................. 7-005749
Jan. 16, 1996 [JP] Japan .................................. 8-004627

[51] Int. Cl.⁶ .................................................. G03D 3/08
[52] U.S. Cl. ...................................... 396/616; 396/617
[58] Field of Search .............................. 354/319–321; 226/148, 150, 152, 181, 188, 189, 193; 250/559.29; 355/72, 75, 27–29; 396/612, 613, 616, 617, 620, 622

[56] References Cited

U.S. PATENT DOCUMENTS 3,678,282  7/1972  Johnson et al. ................. 250/559.29

FOREIGN PATENT DOCUMENTS

| | | |
|---|---|---|
| 59-111134 | 10/1984 | Japan . |
| 61-203439 | 9/1986 | Japan . |
| 63-202484 | 8/1988 | Japan . |
| 63-283270 | 11/1988 | Japan . |
| 4313540 | 11/1991 | Japan . |
| 06156832 | 3/1994 | Japan . |

*Primary Examiner*—D. Rutledge
*Attorney, Agent, or Firm*—Felfe & Lynch

[57] ABSTRACT

A photographic processing apparatus includes a main drive roller mechanism for transporting a photosensitive material in forward and reverse transport directions along a transport passage. The apparatus also includes forward and reverse drive roller mechanisms for assisting the main drive roller mechanism. The forward and reverse drive roller mechanisms are disposed upstream of the main drive roller mechanism relative to the forward transport direction. At least the forward and reverse drive roller mechanisms are supplied with power by a common drive source. The forward drive roller mechanism includes a first one-way clutch mechanism for restricting the rotational force supplied from the drive source when the photosensitive material is transported reversely. The reverse drive roller mechanism includes a second one-way clutch mechanism for restricting the rotational force supplied from the drive source when the photosensitive material is transported forwardly.

7 Claims, 3 Drawing Sheets

PHOTOGRAGHIC PROCESSING APPARATUS

BACKGROUND OF THE INVENTION

1. Field of the Invention

The present invention relates to a photographic processing apparatus including a main pinch transport mechanism for transporting a photosensitive material back and forth along a transport passage and first and second auxiliary pinch transport mechanisms.

2. Description of the Related Art

A photographic processing apparatus of the above-noted type is designed for effecting various operations such as a development or printing on a photosensitive material such as a photographic film or a print paper. And, for effecting these operations, the apparatus includes a transport mechanism for transporting the photosensitive material.

A plurality of such transport mechanisms as noted above are provided along a transport passage of the photosensitive material. These mechanisms are operated in appropriate association with each other for transporting the photosensitive material by means typically of roller or rotary belt pairs which are operable to pinch therebetween the photosensitive material for its transportation. For instance, for feeding the photosensitive material, that is, for forwardly transporting the material, first, the first and second auxiliary pinch transport mechanisms transport the material, and then when a leading end of the material has reached the main pinch transport mechanism, this main mechanism alone further transports the material. Conversely, for transporting backwards the photosensitive material, namely, for reversely transporting the material, the material is kept transported by the driving force of the main pinch transport mechanism as long as this mechanism keeps pinching the material. When the material departs from this main mechanism, it is then transported by the driving forces of the first and second pinch transport mechanisms. That is to say, the photosensitive material is transported at a transporting speed provided by the main pinch transport mechanism while it is transported by the driving force of this main pinch mechanism. With this construction, it is possible to accurately determine a feeding length of the photosensitive material with sole consideration of the transporting speed provided by the main pinch transport mechanism.

According to the above construction, the forward and reverse transportations of the photosensitive material by the main pinch transport mechanism may be assisted simply by switching over the first and second auxiliary pinch transport mechanisms. However, a slack may occur due to a difference which may be present between the transporting speeds provided respectively by the first and second auxiliary pinch transport mechanisms, and such slack may cause the photosensitive material under transportation to inadvertently come into contact with a certain adjacent component. Such condition can develop into a serious mechanical trouble especially in the case of the forward transportation of the photosensitive material which is generally effected for a long period of time.

SUMMARY OF THE INVENTION

In view of the above-described state of the art, a primary object of the present invention is to avoid a disadvantageous effect on transportation of a photosensitive material attributable to a difference between transporting speeds respectively provided by two auxiliary pinch transport mechanisms adapted for assisting forward and reverse transportations of the photosensitive material by a main pinch transport mechanism.

For accomplishing the above-noted object, with a photographic processing apparatus, according to the present invention, the first and second auxiliary pinch transport mechanisms are disposed upstream of the main pinch transport mechanism relative to the forward transport direction. At least the first and second auxiliary pinch transport mechanisms are supplied with power by a common drive source. Further, either the first auxiliary pinch transport mechanism or second auxiliary pinch transport mechanism includes forward drive restricting means for restricting the rotational force supplied from the drive source when the photosensitive material is transported forwardly.

Accordingly to the above-described construction, during forward transportation of the photosensitive material, either the first auxiliary pinch transport mechanism or second auxiliary pinch transport mechanism, that is, the one auxiliary pinch transport mechanism not having the forward drive restricting means, substantially acts as a drive transport unit while the other auxiliary pinch transport mechanism acts as a transport guide unit. With these, while the first and second auxiliary pinch transport mechanisms employ the simple constructions sharing the single drive source, it is possible to prevent the two auxiliary pinch transport mechanisms from interfering with the transporting functions of each other at least in the forward transport direction even if there exists a difference between the transport speeds provided by these mechanisms.

According to one preferred embodiment of the present invention, the forward drive restricting means is provided to the second auxiliary pinch transport mechanis, while the first auxiliary pinch transport mechanism includes reverse drive restricting means for restricting the rotational force supplied from the drive source when the photosensitive material is transported reversely.

According to the above construction, during forward transport of the photosensitive material, the first auxiliary pinch transport mechanism substantially functions as the drive transport unit while the second auxiliary pinch transport mechanism functions as the guide unit. Conversely, during reverse transport of the photosensitive material, the second auxiliary pinch transport mechanism substantially functions as the drive transport unit while the first auxiliary pinch transport mechanism functions as the guide unit. With these, while the first and second auxiliary pinch transport mechanisms employ the simple constructions sharing the single drive source, it is possible to prevent the two auxiliary pinch transport mechanisms from interfering with the transporting functions of each other in both the transport directions even if there exists a difference between the transport speeds provided by these mechanisms.

According to a further embodiment of the present invention, the first and second auxiliary pinch transport mechanisms are disposed in opposition to each other so as to pinch the photosensitive material therebetween. In this case, each auxiliary mechanism can act as an opposed guide for pinching the photosensitive material for the other mechanism. Hence, it is not necessary to provide each auxiliary mechanism with an opposed guide of its own, so that this construction may contribute to cost reduction and also to saving of the installment space for the apparatus. Also, for the purpose of achieving further reduction in the cost and space, the main pinch transport mechanism too receives the rotational drive force from the same power source as the first and second auxiliary pinch transport mechanisms. This can simplify the control scheme of the drive source such as an electric motor.

As a preferred embodiment of the first and second auxiliary pinch transport mechanisms as proposed by the present invention, the first auxiliary pinch transport mechanism comprises a forward rotary drive roller mechanism which can come into contact with a first drive shaft and the photosensitive material and which includes a first cylindrical member rotatable by the first drive shaft. The reverse drive restricting means is disposed in a force transmission passage between the drive source and the first cylindrical member. Further, the second auxiliary pinch transport mechanism comprises a reverse rotary drive roller mechanism which can come into contact with a second drive shaft and the photosensitive material and which includes a second cylindrical member rotatable by the second drive shaft. The forward drive restricting means is disposed in a force transmission passage between the drive source and the second cylindrical member.

If the auxiliary pinch transport mechanisms are provided as the drive roller mechanisms as described above, the transports speed of the photosensitive material provided by the respective auxiliary transport mechanism can be freely and readily set by appropriately selecting the rotation rates of the drive shafts or the outside diameters of the cylindrical members. Moreover, if the drive restricting means is disposed between the drive source and the cylindrical member, especially in the force transmission passage therebetween, the drive roller mechanisms can be formed compact.

According to a still further aspect of the invention, the main pinch transport mechanism too comprises a main drive roller mechanism having a cylindrical member which can come into contact with the photosensitive material. This cylindrical member of the main drive roller mechanism has a peripheral speed which is faster, in a zero-load condition, than a peripheral speed of the first cylindrical member. Further, when the photosensitive material is transported in the forward direction, the reverse drive restricting means allows free rotation of the first cylindrical member. With this construction, the cylindrical member of the main drive roller mechanism disposed downstream in the transport direction provides a transporting speed which is faster than the transporting speed provided by the first cylindrical member of the forward drive roller mechanism disposed upstream. Therefore, there occurs no slack in the photosensitive material between the position of the main drive roller mechanism and the forward drive roller mechanism. Moreover, a difference between the transporting speeds provided respectively by the cylindrical member of the main drive roller mechanism and the first cylindrical member can be compensated for by a corresponding amount of the free rotation of the first cylindrical member allowed by the reverse drive restricting means. The force restricting means having such function as above can be realized by a one-way clutch mechanism which is known per se. In particular, if a roller type one-way clutch mechanism is employed, this mechanism will require only a limited space for its accommodation which can be provided between the drive shaft and the cylindrical member and this mechanism will not require any external control, either.

According to a preferred embodiment proposed by the present invention with respect to the reverse transport operation, the second cylindrical member has a peripheral speed which is faster, in a zero-load condition, than the peripheral speed of the cylindrical member of the main drive roller mechanism, and also drive force decreasing means is provided for allowing slippage of the photosensitive material relative to the second cylindrical member during the reverse transportation of the photosensitive material.

With the above construction, during the reverse transportation too, there occurs no slack in the photosensitive material as the material receives an appropriate tension, since the second auxiliary pinch transport mechanism provides the transporting speed faster than the transporting speed provided by the main pinch transport mechanism. As the main pinch transport mechanism provides a pinching force strong enough to avoid slippage of the photosensitive material relative thereto, the difference between the transporting speeds provided respectively by the main pinch transport mechanism and the second auxiliary pinch transport mechanism can be compensated for by the drive force decreasing means provided to the second cylindrical member. This drive force decreasing means, in its simple form, can be realized by e.g. a limited-slip friction surface formed in the surface of the second cylindrical member. In this respect, during the reverse transportation, the first cylindrical member of the first auxiliary pinch transport mechanism contacting the transported photosensitive material will tend to be rotated at a higher rate than the rotation of the first drive shaft, due to the afore-described relationships among the first and second cylindrical members and the cylindrical member of the main pinch transport mechanism. However, this rotation of the first cylindrical member can be matched with the rotation of the first drive shaft. For this reason, a slippage occurs between the first cylindrical member and the photosensitive material by an amount corresponding to the speed difference therebetween.

According to still further embodiment of the invention, the photosensitive material comprises a print paper. The first and second auxiliary pinch transport mechanisms are provided to a print-paper magazine which is detachably attached to the apparatus body and which supplies the print paper to the apparatus body. In this case, in addition to the normal forward transportation, it becomes also necessary to take up the print paper (reversely transport the print paper) once transported to the apparatus body, when the print-paper magazine is replaced for changing the size of the print paper for instance. Then, according to the present invention, the requirement of the smooth forward and reverse transportations can be simply met by forward and reverse operations of the drive source, such as a motor, for driving the main pinch transport mechanism and the first and second auxiliary pinch transport mechanisms.

According to a still further aspect of the invention, the apparatus further comprises a cutter for cutting the print paper disposed adjacently downstream of the main pinch transport mechanism relative to the forward transportation direction. With this, it becomes possible to advantageously reduce the length of the print paper to be rewound into the print-paper magazine. With this apparatus, the print paper may be smoothly rewound into the print-paper magazine, in comparison with a construction in which a significant length of print paper needs to be rewound into the magazine.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of a photographic printer apparatus as one example of a photographic processing apparatus relating to the present invention will be described next with reference to the accompanying drawings.

Figure 1:
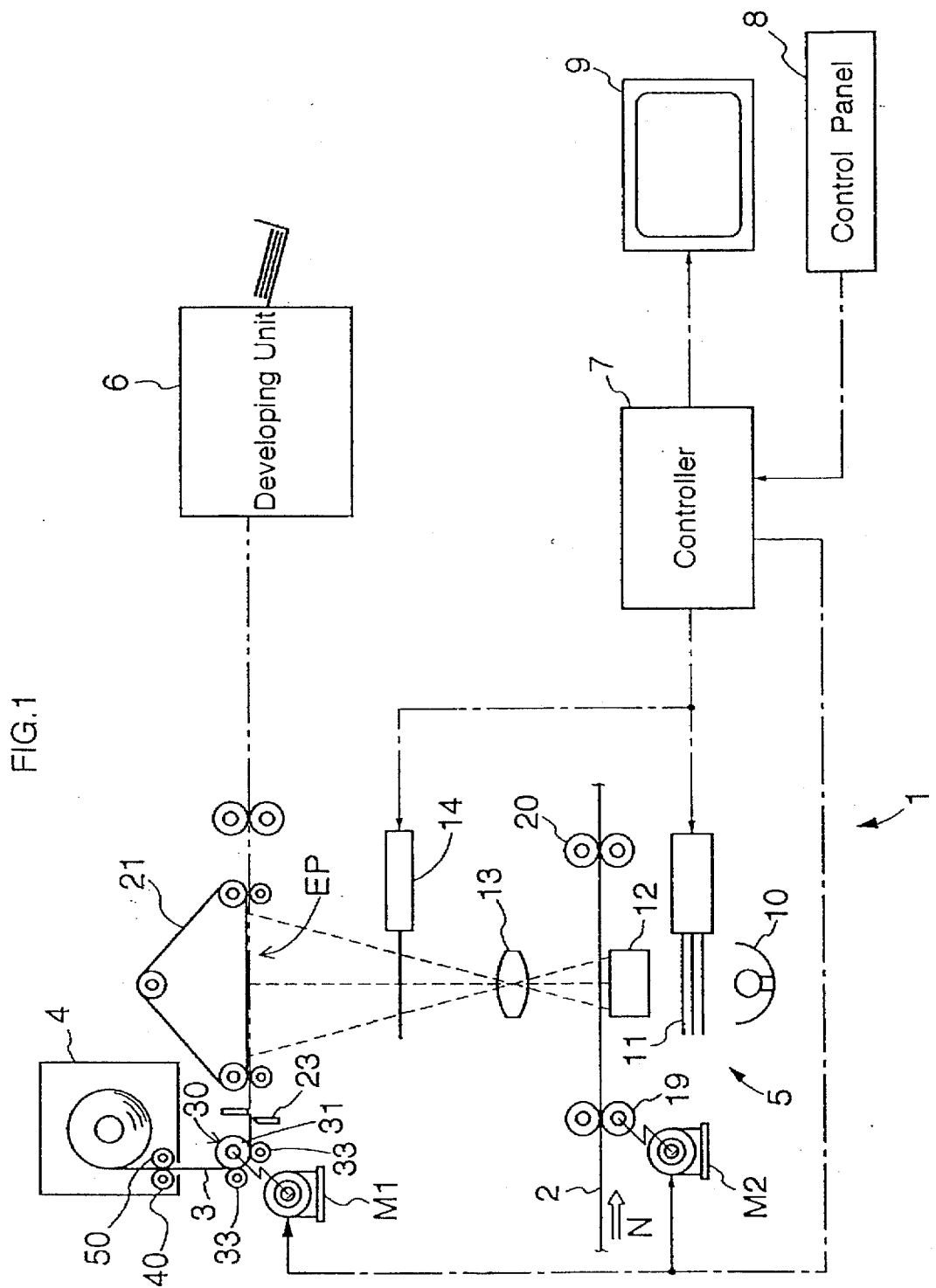
FIG. 1 is a schematic construction view of a photographic processing apparatus according to one preferred embodiment of the present invention.

As schematically shown in FIG. 1, a photographic printing apparatus 1 includes a projection exposure unit 5 for projecting and exposing image information of a film 2 on to a print paper 3 as a photosensitive material, a developing unit 6 for developing the print paper 3 exposed by the projection exposure unit 5, and a controller 7 for controlling operations of the various components of this photographic printing apparatus 1. The controller 7 is connected to a control panel 8 for effecting inputs of various instructions and mode settings and a monitor 9 for displaying image information.

The print paper 3 withdrawn from a print-paper magazine 4 in which the print paper 3 is stored in a rolled state, is cut into a size bearing one film frame amount of image information. Then, the paper is exposed by the projection exposure unit 5, developed by the developing unit 6 and then discharged from the apparatus.

The projection exposure unit 5 includes a light source 10, a light modulating filter 11 for adjusting color balance of the light to be irradiated on the film 2, a mirror tunnel 12 for uniformly mixing the color components of the light past the light modulating filter 11, a printing lens 13 for focusing the image of the film 2 on the print paper 3 and a shutter 14, with these mentioned components being aligned along a common optical axis.

Along the exposure light path, a roller pair or roller 19 is disposed upstream in the transport passage of the film 2, and a further roller 20 is disposed downstream. These rollers 19, 20 are driven by a common motor M2 in association with each other.

In a transport passage of the print paper 3 extending from the print-paper magazine 4 to the developing unit 6, there is provided an exposure position EP for the print paper 3. Here, a transportation of the print paper 3 in the direction from the print-paper magazine 4 to the developing unit 6 will be referred to as a forward transportation; whereas, the transportation of the paper 3 in the opposite direction from the developing unit 6 to the print-paper magazine 4 will be referred to as a reverse transportation.

At the exposure position EP for the print paper 3, there is provided a transport belt 21 for transporting the print paper 3 in the area about this exposure position EP. Upstream of this transport belt 21 in the forward transportation direction, a main drive roller mechanism 30 is disposed. This main drive roller mechanism 30 includes a cylindrical member 31 contactable with the print paper 3 and a drive shaft 32 fixed coaxially with this cylindrical member 31. The drive shaft 32 receives a rotary drive force from a motor M1. The main drive roller mechanism 30 further includes two guide rollers 33 in opposition to the cylindrical member 31 across the print paper transport passage. In operation, the main drive roller mechanism 30 bi-directionally transports the print paper 3 in the forward and reversely with the paper 3 being pinched between the cylindrical member 31 and the guide rollers 33. Further, between the transport belt 21 and the main drive roller mechanism 30, there is disposed a cutter 23 for cutting the print paper 3 into a size bearing one frame amount of image information.

Figure 2:
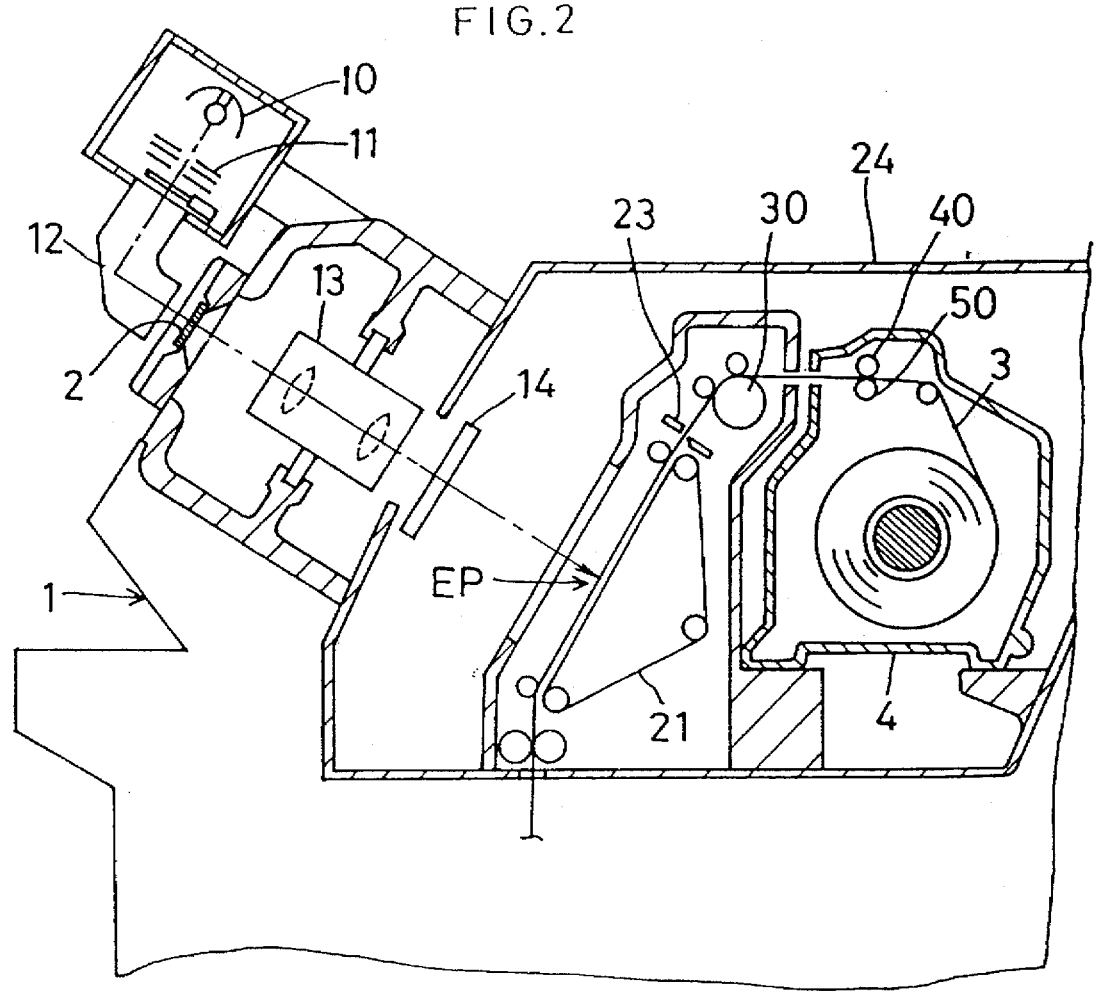
FIG. 2 is a section view showing a portion of a print paper transporting passage relating to the embodiment.

As shown in a partially enlarged view of FIG. 2, the print-paper magazine 4 is attachable and detachable relative to the main body of the photographic printing apparatus 1. In the attached condition, as the magazine is covered with a light-shielding cover 24, inadvertent exposure of the print paper 3 withdrawn from the magazine 4 is prevented. By exchanging this print-paper magazine 4, print papers 3 of various sizes can be supplied to the photographic printing apparatus 1. The print-paper magazine 4 includes therein a forward drive roller mechanism 40 for feeding the print paper 3 from the magazine 4 and a reverse drive roller mechanism 50 for reversely transporting the print paper 3 back into the magazine 4, with the two mechanisms 40, 50 being disposed in opposition to each other across the print paper transport passage.

Figure 5:
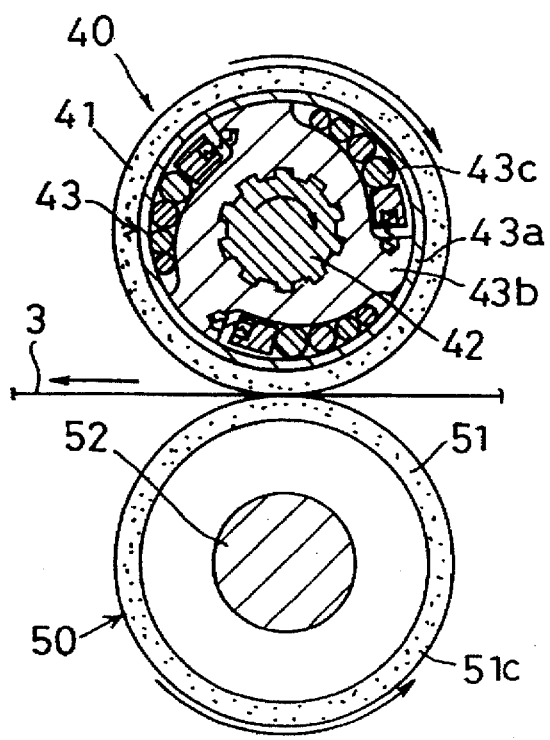
FIG. 5 is an enlarged view of a first one-way clutch mechanism relating to the embodiment.
Figure 6:
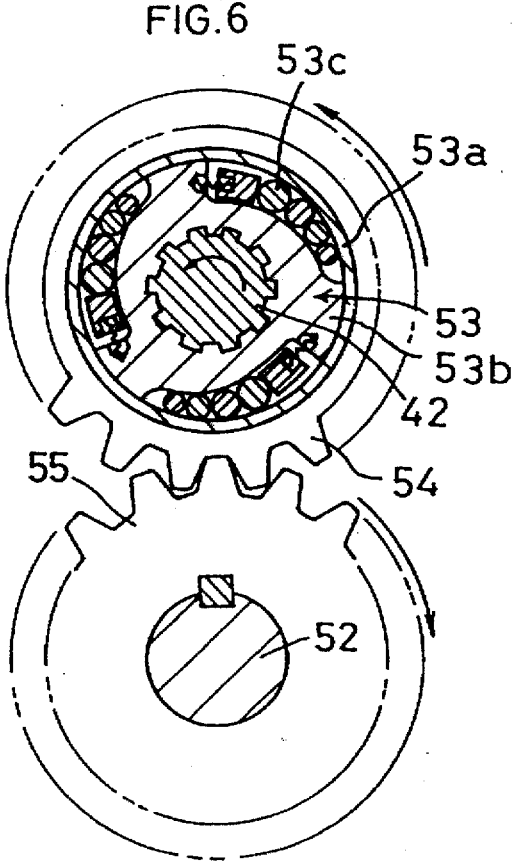
FIG. 6 is an enlarged view of a second one-way clutch mechanism relating to the embodiment.

The forward drive roller mechanism 40 and the reverse drive roller mechanism 50 are disposed upstream of the main drive roller mechanism 30 relative to the forward transportation direction. The forward drive roller mechanism 40 includes a first cylindrical member 41 and a first drive shaft 42 coaxial with this first cylindrical member 41. The reverse drive roller mechanism 50 includes a second cylindrical member 51 and a second drive shaft 52 coaxial with the second cylindrical member 51. The aforementioned motor M1 supplies a rotary drive force to the first drive shaft 42 also. And, this rotary drive force is further transmitted from this first drive shaft 42 to the second drive shaft 52 through a first intermediate gear 54 and a second intermediate gear 55. As may be apparent from FIG. 5, the forward drive roller mechanism 40 includes a first roller type one-way clutch mechanism 43, as a reverse drive restricting means, interposed between the first cylindrical member 41 and the first drive shaft 42. This first one-way clutch mechanism 43 allows transmission of forward drive force of the motor M1 for the forward transportation from the first drive shaft 42 to the first cylindrical member 41, while inhibiting transmission of reverse drive force of the motor M1 for the reverse transportation from the first drive shaft 42 to the first cylindrical member 41. As may be apparent from FIG. 6, the reverse drive roller mechanism 50 includes a second roller type one-way clutch mechanism 53, as a forward drive restricting means, interposed between the second cylindrical member 51 and the first drive shaft 42. This second one-way clutch mechanism 53 allows transmission of forward drive force of the motor M1 for the reverse transportation from the first drive shaft 42 to the first intermediate gear 54 and eventually to the second cylindrical member 51, while inhibiting transmission of reverse drive force of the motor M1 for the forward transportation from the first drive shaft 42 to the first intermediate gear 54 and eventually to the second cylindrical member 51. The first one-way clutch mechanism 43 includes an outer race 43a fixed to the first cylindrical member 41, an inner race 43b fixed to the first drive shaft 42, and a clutch roller set 43c interposed between the outer race 43a and the inner race 43b. The second one-way clutch mechanism 53 includes an outer face 53a fixed to the first intermediate gear 54, an inner race 53b fixed to the first drive shaft 42, and a clutch roller set 53c interposed between the outer race 53a and the inner race 53b.

The first cylindrical member 41 of the forward drive roller mechanism 40 and the second cylindrical member 51 of the reverse drive roller mechanism 50 are disposed in opposition to each other across the print paper 3 transported along the print paper transporting passage. During the forward transportation, the first cylindrical member 41 acts substantially as a drive roller while the second cylindrical member 51 acts as a guide roller. During the reverse transportation, the second cylindrical member 51 acts substantially as a drive roller while the first cylindrical member 41 acts as a guide roller, respectively.

A gear 24 fixed to the drive shaft 32 of the main drive roller mechanism 30 and a driven gear 25 fixed to the drive shaft 42 of the forward drive roller mechanism 40 are coupled with each other via two connecting gears 26. The force transmission between an output shaft of the motor M1 and the drive shaft 32 is effected by means of a timing belt transmission mechanism 27 in this particular embodiment.

The main drive roller mechanism 30 provides a transporting speed for the print paper 3, which speed actually comprises a peripheral speed V1 of the cylindrical member 31. The forward drive roller mechanism 40 provides a transporting speed for the print paper 3, which speed actually comprises a peripheral speed V2 of the cylindrical member 41. Also, the reverse drive roller mechanism 50 provides a transporting speed for the print paper 3, which speed actually comprises a peripheral speed V3 of the cylindrical member 51. Then, these speeds V1, V2 and V3 are determined by a transmission ratio between each cylindrical member and the motor M1 and also the diameter of each cylindrical member. And, in the instant embodiment, these speeds are so correlated to each other that the peripheral speed V3 of the second cylindrical member 51 is slightly greater than the peripheral speed V1 of the cylindrical member 31 and also that the peripheral speed V1 of the cylindrical member 31 is slightly greater than the peripheral speed V2 of the first cylindrical member 41.

Incidentally, the pinching force applied by the main drive roller mechanism 30 to the print paper 3 is set in advance to be stronger than the pinching force applied by the forward drive roller mechanism 40 or the reverse drive roller mechanism 80 to the print paper 3. Accordingly, when the print paper 3 is transported simultaneously by the main drive roller mechanism 30 and the forward drive roller mechanism 40 or the reverse drive roller mechanism 50, the print paper 3 is transported at the transporting speed provided by the main drive roller mechanism 30. Thus, the position of the print paper 3 can be accurately calculated from the operation of the main drive roller mechanism 30.

The two connecting gears 26 are supported to the main body of the photographic printing apparatus 1, such that these connecting gears 26 may be disconnected from the driven gear 25 when the print-paper magazine 4 is to be detached from the photographic printing apparatus body 1.

Though not shown, the developing unit 6 includes a plurality of tanks containing processing liquids for developing the exposed print paper 3. The print paper 3 is developed through its passages through these tanks one after another.

Next, the operation of the photographic printing apparatus 1 having the above-described construction will be briefly described.

Figure 3:
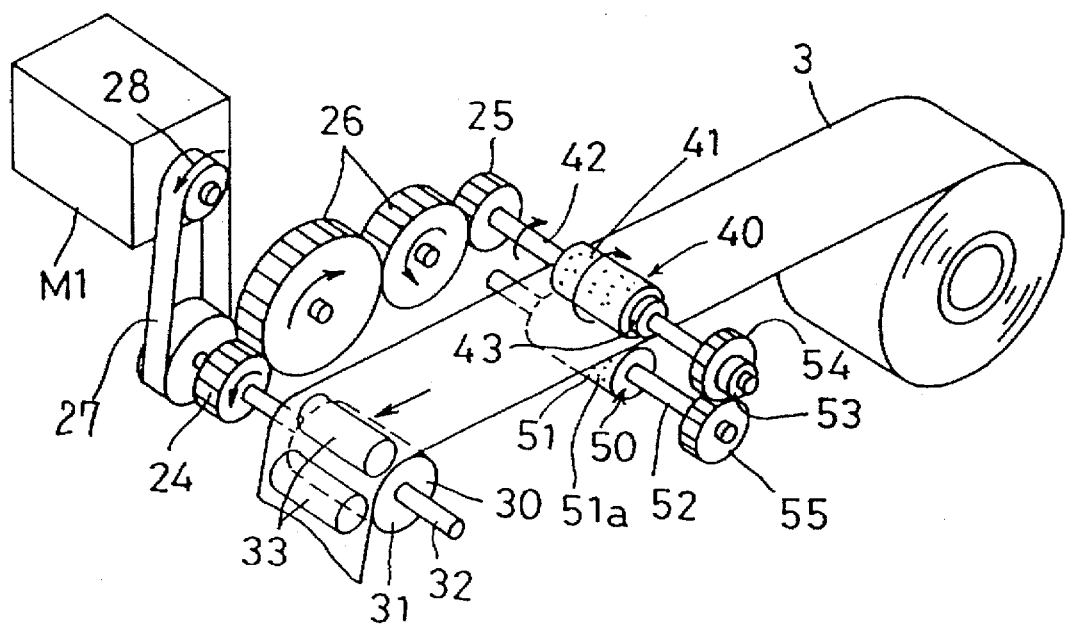
FIG. 3 is a schematic perspective view illustrating a forward transportation condition relating to the embodiment.

With the print-paper magazine 4 set to the photographic printing apparatus body 1, if the motor M1 is rotated in a direction denoted by an arrow 28 in FIG. 3 (considered as the counterclockwise direction), this driving force causes the first cylindrical member 41 of the forward drive roller mechanism 40 to rotate clockwise so as to feed the print paper 3 from the print-paper magazine 4. In this, although the second cylindrical member 51 of the reverse drive roller mechanism 50 is also rotated in association with the movement of the print paper 3 being fed, since the rotation rate of first drive shaft 42 is higher than the rotation rate of the first intermediate gear 54 due to the afore-described relationship: V3>V1>V2; then, the second one-way clutch mechanism 53 functions to render freely rotatable the first intermediate gear 54, resultantly the second cylindrical member 51.

When a leading end of the print paper 3 being fed reaches the position of the main drive roller mechanism 30 so as to cause its cylindrical member 31 to transport the print paper 3; then, due to the above relationship: V3>V1>V2, the first cylindrical member 41 is accelerated in its rotation rate by being pulled by the print paper 3, so that this first cylindrical member 41 over-runs or over-rotates relative to the first drive shaft 42 because of the function of the first one-way clutch mechanism 43. On the other hand, the second cylindrical member 51 is maintained under the free rotation condition since the rotation rate of the first drive shaft 42 remains higher than the rotation rate of the first intermediate gear 54. With this, the print paper 3 is transported without slippage occurring between this print paper 3 and the first cylindrical member 41 or the second cylindrical member 51.

When the print paper 3 is cut into the size corresponding to one frame amount of image information and then transported to the exposure position EP of the projection exposure unit 5, this print paper 3 is now exposed with the image information of the film 2.

The exposure condition used in the above step is determined in advance based on image density information derived from the image information of the film 2 picked up by an un-illustrated image information pick-up device under the control of the controller 7. And, the light modulating filter 11 and the shutter 14 are controlled to as to provide this determined exposure condition. The print paper 3 after its exposure is then developed by the developing unit 6 and discharged from the system.

Figure 4:
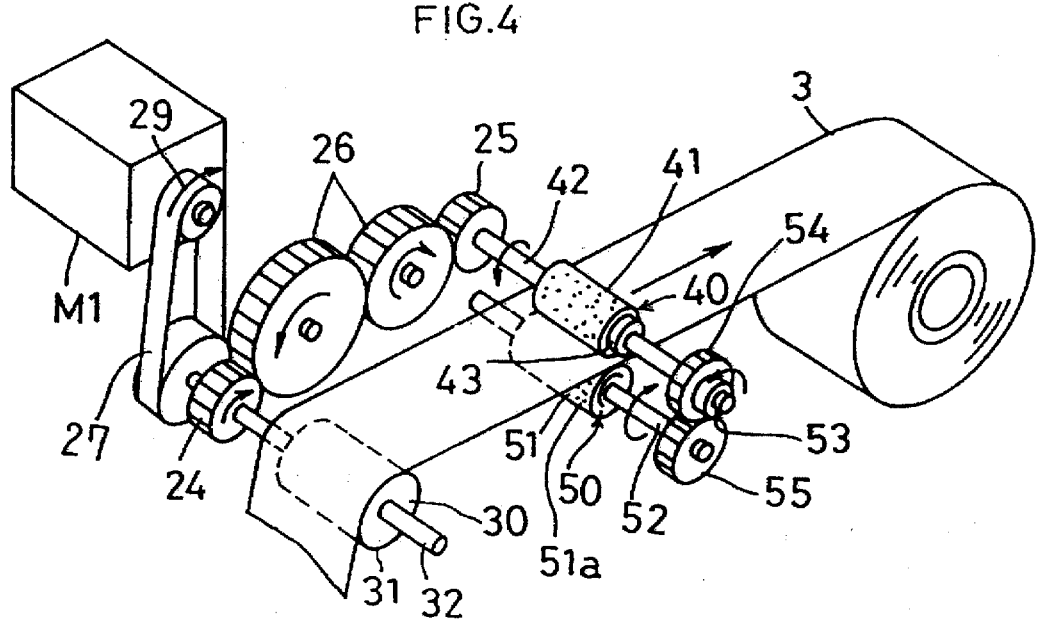
FIG. 4 is a schematic perspective view illustrating a reverse transportation condition relating to the embodiment.

On the other hand, for rewinding into the print-paper magazine 4 the print paper 3 once fed for the purpose of e.g. exchange of the print-paper magazine 4, the motor M1 is rotated in the opposition direction denoted by an arrow 29 in FIG. 4 (clockwise direction).

In this case, while the print paper 3 is being transported by the main drive roller mechanism 30, the peripheral speed of the second cylindrical member 51 of the reverse drive roller mechanism 50 is faster than the current transporting speed of the print paper 3, slippage occurs between the second cylindrical member 51 and this print paper 3. For this reason, the second cylindrical member 51 defines, in its surface, a limited-slip friction surface 51a as means for decreasing the transporting drive force. Also, since the rotation rate of the first cylindrical member 41 of the forward drive roller mechanism 40 driven to rotate by the movement of the print paper 3 tends to become higher than the rotation rate of the drive shaft 42 due to the relationship: V3>V1>V2. Then, the first one-way clutch mechanism 43 is activated to match the rotation rate of the first cylindrical member 41 with that of the drive shaft 42. Therefore, slippage occurs also between the first cylindrical member 41 and the print paper 3. Therefore, it is proposed that a similar limited-slip friction face be provided also in the surface of the first cylindrical member 41 when necessary. When the print paper 3 is moved away from the main drive roller mechanism 30, this print paper 3 is then transported by the drive force of the reverse drive roller mechanism 50.

[Modified Embodiments]

Some modified embodiments of the invention will be specifically described next.

(1) In the foregoing embodiment, the print paper 3 is employed as one example of the photosensitive material. The apparatus of the invention may be employed also for transporting other materials such as a photographic film, e.g. a negative film.

(2) In the foregoing embodiment, the photographic printing apparatus is disclosed as one example of the photographic processing apparatus. The invention may be embodied also as any other apparatus such as a developing apparatus for a photographic film.

(3) In the foregoing embodiment, the main pinch transport mechanism and the first and second auxiliary pinch transport mechanisms respectively comprise the drive roller mechanisms. Instead, belt transport mechanisms for transporting the print paper 3 by means of an endless belt may be employed.

(4) In the foregoing embodiment, the one-way clutch mechanism 43 is disposed between the first drive shaft 42 and the first cylindrical member 41. Instead, this mechanism 43 may be disposed between the first drive shaft 42 and the driven gear 25. The disposing position of the mechanism can vary as long as its direction of transmission force to the first cylindrical member 41 remains unchanged. Same can be said as for the other one-way clutch mechanism 53.

(5) The transmission mechanism for transmitting the drive force of the motor M1 to the respective drive roller mechanisms can variably employ gears, belts as appropriately selected.

(6) In the foregoing embodiment, the limited-slip friction layer is provided in the surface of the cylindrical member as the drive force decreasing means. Instead, a torque limiter may be provided between the cylindrical member and the drive source.

(7) The main drive roller mechanism 30, the forward drive roller mechanism 40 and the reverse drive roller mechanism 50 may be rendered elastically adjustable relative to the transport passage, so as to provide desired pinching forces to the print paper to be transported. Such modifications too are construed to be encompassed within the scope of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A photographic processing apparatus for transporting a photosensitive material in forward and reverse transport directions along a transport passage, which apparatus comprises:

a main pinch transport mechanism which is driven rotatably to transport said photosensitive material in said forward and reverse transport directions;

first and second auxiliary pinch transport mechanisms disposed upstream of the main pinch transport mechanism relative to the forward transport direction, said first and second auxiliary pinch transport mechanisms being supplied with power by a common drive source and disposed in opposition to each other so as to pinch the photosensitive material therebetween;

reverse drive restricting means provided to said first auxiliary pinch transport mechanism for restricting the rotational force supplied from the drive source to the first pinch transport mechanism when the photosensitive material is transported in the reverse direction; and forward drive restricting means provided to said second auxiliary pinch transport mechanism for restricting the rotational force supplied from the drive source to the second pinch transport mechanism when the photosensitive material is transported in the forward direction.

2. A photographic processing apparatus as defined in claim 1, wherein the main pinch transport mechanism is supplied with power by the drive source of the first and second auxiliary pinch transport mechanisms.

3. A photographic processing apparatus as defined in claim 1, wherein the first auxiliary pinch transport mechanism comprises a forward rotary drive roller mechanism which can come into contact with a first drive shaft and the photosensitive material and which includes a first cylindrical member rotatable by the first drive shaft, the reverse drive restricting means being disposed in a force transmission passage between the drive source and the first cylindrical member; and the second auxiliary pinch transport mechanism comprises a reverse rotary drive roller mechanism which can come into contact with a second drive shaft and the photosensitive material and which includes a second cylindrical member rotatable by the second drive shaft, the forward drive restricting means being disposed in a force transmission passage between the drive source and the second cylindrical member.

4. A photographic processing apparatus as defined in claim 3, wherein the main pinch transport mechanism comprises a main drive roller mechanism having a cylindrical member which can come into contact with the photosensitive material, said cylindrical member of the main drive roller mechanism having a peripheral speed which is faster, in a zero-load condition, than a peripheral speed of the first cylindrical member; and when the photosensitive material is transported in the forward direction, the reverse drive restricting means allows free rotation of the first cylindrical member.

5. A photographic processing apparatus as defined in claim 3, wherein said reverse drive restricting means comprises a one-way clutch mechanism for allowing the force transmission from the first drive shaft to the first cylindrical member only when the photosensitive material is transported the forward transportation direction; and said forward drive restricting means comprises a one-way clutch mechanism for allowing the force transmission from the second drive shaft to the second cylindrical member only when the photosensitive material is transported in the reverse transporting direction.

6. A photographic processing apparatus as defined in claim 4, wherein the second cylindrical member has a peripheral speed which is faster, in a zero-load condition, than the peripheral speed of the cylindrical member of the main drive roller mechanism, drive force decreasing means being provided for allowing slippage of the photosensitive material relative to the second cylindrical member during the reverse transportation of the photosensitive material.

7. A photographic processing apparatus as defined in claim 6, wherein said drive force decreasing means comprises a limited-slip friction surface formed in the surface of the second cylindrical member.

* * * * *